ary_examiner—G. R. Simmons

United States Patent
Kreithen et al.

[11] 3,767,990
[45] Oct. 23, 1973

[54] CONTROL SYSTEM FOR PRODUCING MULTI-AXIS CONTOUR MOVEMENT FOR A STEPPING MOTOR DRIVE

[75] Inventors: Marvin L. Kreithen, Huntingdon Valley; John J. Lawler, Newportville, both of Pa.

[73] Assignee: Bridgeport Machines, Inc., Bridgeport, Conn.

[22] Filed: Feb. 9, 1972

[21] Appl. No.: 224,752

[52] U.S. Cl. .............. 318/573, 318/685, 318/696, 318/574, 318/415
[51] Int. Cl. .............................................. G05b 19/24
[58] Field of Search .................. 318/696, 685, 573, 318/574, 571, 415

[56] References Cited
UNITED STATES PATENTS

| | | | |
|---|---|---|---|
| 3,585,478 | 6/1971 | Leenhouts | 318/574 |
| 3,525,917 | 8/1970 | Leenhouts | 318/574 |
| 3,416,056 | 12/1968 | Motooka et al. | 318/573 |
| 3,422,325 | 1/1969 | Gerber et al. | 318/574 |

Primary Examiner—G. R. Simmons
Attorney—Dexter N. Shaw et al.

[57] ABSTRACT

A multi-axis machine tool or the like employing controls for an open loop stepping motor system of two or more axes in which variable frequency feedrate clock pulses are generated to ultimately control the speed of the various stepping motors. The frequency of the feedrate clock pulses is modified in accordance with programmed information; additional information defines the tool path which can either be straight line or circular arc segments and characteristically the feedrate clock pulse generation means increases pulse frequency at the beginning of a segment in such manner as to increase motor speed in accordance with system inertial limitations from a speed below to a speed above the slewing rate of the stepping motors. Thereafter upon sensing a predetermined distance from the end of the segment, pulse frequency is reduced to reduce the stepping motor speed below the slewing rate. The feedrate clock pulse chain is used by the interpolation logic to trigger two consecutive calculations, the time lapse between the clock pulse and the second calculation being so short compared to the time lapse between consecutive clock pulses, that the action initiated by the results of the calculations can be considered for all intents and purposes to be coincident with the clock pulse. The first calculation always generates a major axis interpolation pulse, during the second calculation an error accumulation register is tested to determine whether a minor axis interpolation pulse should be generated to minimize the error from the programmed path. Thus the major axis interpolation pulse chain corresponds directly to the frequency of the feedrate clock chain, the minor axis interpolation pulse chain may be irregular with respect to the chain of feedrate clock pulses. A predetermined member of interpolation pulses are then used to generate each of the major and minor axis step pulses so that any irregularity in minor axis pulse frequency is eliminated and resolution is improved.

14 Claims, 11 Drawing Figures

PATENTED OCT 23 1973 3,767,990

CONTROL SYSTEM FOR PRODUCING MULTI-AXIS CONTOUR MOVEMENT FOR A STEPPING MOTOR DRIVE

This invention relates to automatically controlling the motion of machine tool slides and other multi-axis mechanisms by using step motors. Considering the machine tool application as typical, a control system is provided for causing tool movement relative to a work piece to achieve two or three dimensional contouring of the work piece to a predetermined shape in accordance with a predetermined program.

In the prior art machine tool controls have been capable of producing linear tool movement in any angular direction with instructions that consist of only the final coordinates of the next desired point relative to a known point. Additionally, machine tool controls have been devised which are capable of producing circular arcuate movement of tools in which the only instructions required consist of the final coordinates of the arc and the relationship of the first point on the arc to the arc's center.

Some prior controls, such as that described in United States Pat. No. 3,422,325 to Gerber rely upon feedback for error correction. Others use an open loop and stepping motors, as described in United States Pat. No. 3,525,917 to Leenhouts, and must rely upon the inherent accuracy of the system and the precision of stepping and control thereof for accuracy.

The present invention relates to the latter type of system which in more general terms is applicable to a system capable of moving one part relative to another by relative movement of at least three series connected relatively movable members along at least two predetermined axes defined by cooperating structure of adjacent members. The system has at least two stepping motors, each acting between and moving said adjacent members along the predetermined axes in discrete increments. The at least two step motors acting together drive said parts along a series of successive segments approximating a predetermined path. Systems are described herein for the minimum components defined as well as for systems employing four series connected members providing three axes motion along which is provided by three stepping motors.

More specifically the invention relates to improved interpolation means for the control of stepping motors driving slides or other moving parts on a multi-axis mechanism in order to produce the programmed relative movement along the various axes. The interpolation means in accordance with the present invention first selects a major axis. Minor axes operations are then made dependent upon the major axis operation. Interpolation pulse generator means in accordance with the present invention generates a major axis pulse for each clock pulse and minor axis pulses as required by the logic of the system to follow the segment. The interpolation logic employs means whereby minor axis pulses are derived only after each major axis pulse upon immediate evaluation of whether a pulse is required along each minor axis and before the next clock pulse. In accordance with the present invention, instead of using interpolation pulses to drive the stepping motor directly, means is provided for deriving step motor pulses to drive their respective stepping motors from said interpolation pulses for the respective axes.

A stepping motor effectively consists of a rotor magnetically detented at fixed positions of a stator. In carrying out the present invention, particular consideration has to be given to the characteristics of commercially available stepping motors. In particular a change in energization of the windings of a stepping motor in a proper sequence effects an incremental rotative movement or step; moreover, the sequence of the change of energization will determine whether the motor will rotate in one direction or the other. At low-step rates, the rotor will move in increments from one fixed position to the next and be held by the magnetic detent. However, at higher step rates, the inertia of the rotor and its coupled load are such that if the step commands are instantaneously removed, the rotor will overdrive the magnetic detent of the next position and thus mis-step. In an open loop system, a mis-step cannot be corrected and thus the system will permanently lose position and be inaccurate. At this high step rate, the step motor is said to be "slewing," i.e., the magnetic force of the stator is sufficient to drive the rotor from position to position, but not sufficient to overcome the inertia of the rotor and its load.

In accordance with the present invention in order to achieve high speed stepping rates, means is provided to cause the step motor to be gradually accelerated to, and decelerated from, the slew rate; moreover, step commands, once slewing is achieved, must be evenly spaced in time.

More specifically, the present invention provides pulse generator means for generating a train of pulses of variable frequency including means for varying the frequency of pulses generated by said pulse generator means both above and below the slewing range of said step motor. Acceleration means causes the pulse generator means to modify pulse frequency upon demand. Particularly at the beginning of each of the successive segments which together approximate the predetermined path the pulse frequency is increased from below slewing range into slewing range at a predetermined rate accomodating the inertial load on the step motor. Also toward the end of such segments ordinarily means is provided for sensing the number of steps remaining to be taken to the end of that segment and to act upon said acceleration means at discrete distances before the end of the pattern to decrease pulse frequency to below the slewing range before the end of the segment. The discrete distances are also a function of the feedrate clock pulse frequency.

Also in accordance with the present invention means is provided to prevent stopping the system at any time until the stepping motor speeds are below the slewing rate.

In accordance with the present invention in order to achieve uniformity of pulse frequency input into each stepping motor, the interpolation pulses themselves are not used but step motor pulses are derived from the interpolation pulses. This is of particular significance with respect to the minor axes in which the interpolation pulses may occur in an irregular pattern. The step motor pulses derived from minor axis step motor pulses are more evenly spaced in time than their corresponding interpolation pulses, depending upon and reflecting the rate of generation, and therefore are more readily accepted by the minor axis stepping motors without error.

More specifically, in accordance with the present invention, logic means is provided to select as a major axis that one of the axes having the greater number of steps to be taken over at least the segment next to be followed. An interpolation pulse train of evenly spaced pulses representing the major axis length of the segment is generated. A train of interpolation pulses is also generated for each minor axis representative of the length of that minor axis segment. Therefore, each minor axis pulse train is composed at most of no more pulses than the major axis pulse train and ordinarily fewer pulses, in which event the pulses most commonly are unevenly spaced from one another. Separate means are provided for each of said axes receiving interpolation pulses from said logic means and producing a step motor pulse for a predetermined number of interpolation pulses such that the variations in spacing of the minor axis interpolation pulse output is averaged and pulses representing a fixed speed occur at regular intervals. This means generating step pulses also has the effect of decreasing the potential error in resolution.

Therefore, the present invention, in addition to supplying the number and sequence of commands to each step motor to produce the movement of the parts to the required location by following a linear or arcuate path, also supplies those commands in such a manner as to provide for the dynamic characteristics of the step motor, even at slewing rates of the motor.

Other features and advantages will hereinafter appear.

For a better understanding of the present invention reference is made to the accompanying drawings in which.

Figure 1:
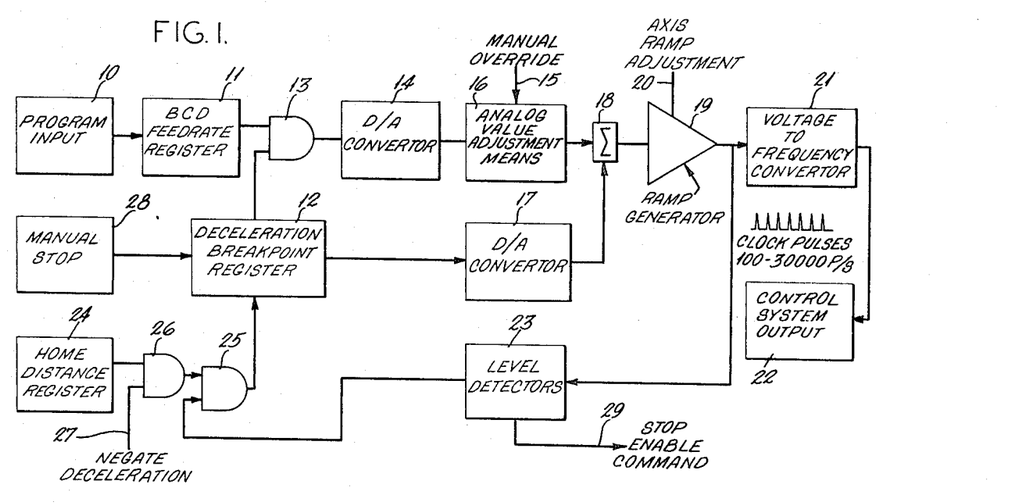
FIG. 1 is a schematic block diagram of a programmable voltage to frequency convertor used to generate feedrate clock pulses.

FIG. 1 shows a block diagram of a variable frequency pulse generator that provides the basic clock timing for the system. The programmed feedrate means input 10 takes input data from a punched or magnetic tape, for example, of from manual means in a form capable of being stored in binary coded decimal (BCD) form in a register 11. The outputs of this register are pulse trains which pass through gate 13. Gate 13 passes the binary coded decimal signal when the output of deceleration breakpoint register 12 provides a signal on its control terminal. If the deceleration breakpoints have not been detected, the digital information stored in the feedrate register is converted by digital to analog (D/A) convertor 14 to an analog voltage that is directly proportional to the numerical feedrate number. A manually set feedrate override 15 enables an operator to visually observe what is happening and make manual adjustments to override the programmed digital feedrate by ± 50 percent of that feedrate at run time by proportionally adjusting the adjusting means 16 to modify the voltage level of the output of the programmed D/A convertor 14. The adjusted voltage is then summed at summing junction 18 with the output of the deceleration breakpoint register 12 as modified by D/A convertor 17, similar to D/A convertor 14. If no breakpoint has been detected, the output of deceleration breakpoint D/A convertor 17 is equal to 0. The summed voltage becomes the set point to a ramp generator 19 that has two ramp rates, one for positive voltage changes and another for negative voltage changes. Additionally, there is provision for an external signal from axis ramp adjustment means 20 to adjust the value of the positive going ramp rate. The output of the ramp generator is converted to a pulse rate by a voltage to frequency oscillator 21 that provides the clock timing pulses for the rest of the control system 22. The output of the ramp generator is also monitored by several level detectors 23. The outputs of the level detectors are applied to gate 25 to control logic signals from a register 24 that contains descrete logical representations of the number of units the major axis is away from the point to which it is programmed to travel.

The deceleration breakpoint register 12 contains the digital representation of a predetermined inter-relationship based on comparison between actual feedrate, as determined by the level detectors 23, and the distance left to be travelled, as determined by the home distance register 24. The contents of the deceleration breakpoint register is converted to a voltage level by a D/A convertor 17 for using in opposing the analog signal from adjusting means 16. Breakpoints are preselected. For example, typical successive breakpoints for a preferred predetermined deceleration profile could be set as follows:

a. Feedrate greater than 24 inches per minute and distance from home less than 400 units.

b. Feedrate greater than 16 inches per minute and distance from home less than 200 units.

c. Feedrate greater than 8 inches per minute and distance from home less than 100 units.

Figures 2, 3:
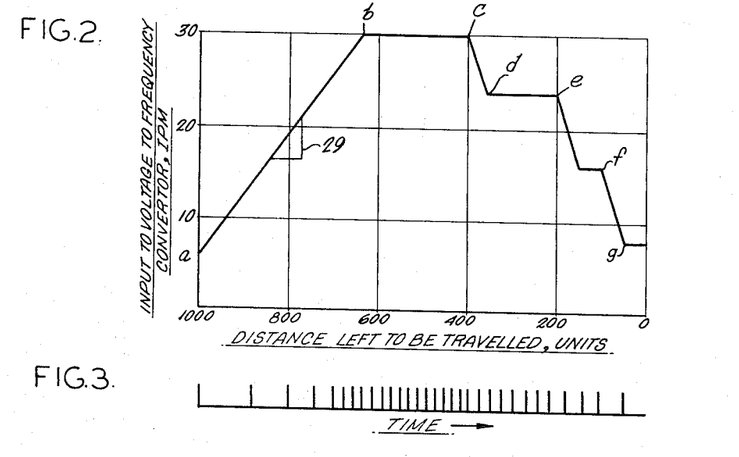
FIG. 2 is a chart of the voltage input to the voltage to frequency oscillator plotted against the distance the axes are away from the home position.
FIG. 3 is a representation of the output pulses from the voltage to frequency convertor.

FIG. 2 is intended to represent an acceleration deceleration pattern based on these figures. Assume the maximum programmed feedrate is 30 inches per minute and the programmed travel distance is 1,000 units. Referring to FIG. 2, there is shown a plot of voltage vs. distance to be travelled showing the inter-relationship between the home distance and the voltage input to the voltage to frequency convertor 21. Immediately after the programmed values are input, the output of the ramp generator ramps up from a residual value at point $a$, less than the slew rate of the motor (in the example shown equivalent to 6 inches per minute) to a point $b$ and a value equivalent to the program feedrate, e.g., here 30 inches per minute. The ramp rate (slope shown by projections 29 along coordinates) is selected and set at a value at which the step motors used in the system can safely pick up the inertial load it is driving. Since the inertial load from axis to axis may vary considerably, an axis ramp adjustment 20 is provided to adjust the ramp as a function of the most heavily loaded axis. The output of the ramp generator is clamped at 30 inches per minute until the home distance is less than 400 units at point c, at which point the first deceleration breakpoint is detected. The output of the feedrate register 11 is then negated by the breakpoint register 12 by removal of the control signal on gate 13 and the voltage value of the programmed D/A convertor 14 goes to zero. At the same time, a voltage equivalent to slightly less than 24 inches per minute is output by the deceleration breakpoint D/A convertor 17 and input at the summing junction 18 of the ramp generator 19. The ramp generator then ramps down from point c to point d leveling off at 24 inches per minute. In a similar manner, breakpoints occur at points e and f in FIG. 2, causing the deceleration profile shown. The residual value g is set below the "slew" rate of the step motor. The number of required breakpoints is a function of the inertia of the step motor and its load, and the system friction. FIG. 3 shows an approximate representation of the resultant pulse rate at system output 22.

As seen in FIG. 1 an additional input means 27 is used to negate the output of the home distance register 24 so that no deceleration breakpoints occur. This is desirable when consecutive moves are approximately tangential so that deceleration is not necessary. Note that, if feedrates below the slew rate of the step motor, e.g., 8 inches per minute, are programmed, an acceleration - deceleration pattern does not occur, the input to the voltage to frequency convertor 21 is always the adjusted output by adjustment means 16 of the programmed D/A convertor 14.

An important advantage of the clock system of FIG. 1 is that the level detectors used in conjunction with the home distance to determine the deceleration breakpoints are constantly monitoring the actual input to the voltage to frequency convertor.

Another important advantage is that the use of many discrete breakpoints enable the step motors to operate with infinitely variable feeds within the slewing range of the step motor.

Another important advantage is that the level detectors are used to enable stopping the step motors without mis-stepping. It has been heretofore indicated that if the step motors are stepping at a pulse rate above their slew rate, the motor will mis-step if the command pulses to the step motor are instantaneously removed. In the present invention, depressing a stop button 28 will cause the ramp generator 19 to ramp down from its previously commanded rate to a residual rate below the slew rate of the step motor. Pulse output to the step motors will continue until the level detectors detect that the pulse rate has decreased to a rate below the step motor slew rate, at which time a stop enable command 29 will be output.

Figure 4:
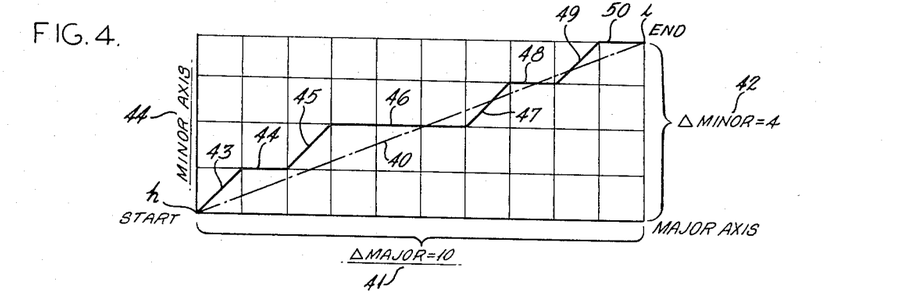
FIG. 4 is a diagrammatic illustration showing a desired linear path of movement and the path of movement achieved by the use of the present invention.

The output frequency of the variable frequency pulse generator determines the step rate of the axis drive motors. Each feedrate clock pulse generates two successive arithmetic calculations, the calculations occurring within a few micro-seconds after the positive going rise of the clock pulses so that the output generated by the calculations occur nearly simultaneously with the clock pulses. Referring to FIG. 4, the method of generating two axis linear motion is illustrated. A straight line 40 having a start $h$ and an end $i$. The line 40 is representative of a desired path of movement, which is to be approximated from operation of stepping motors on two axes. The movement of each motor along its axis consists of increments of movement, or steps, which in accordance with the present invention are scaled such that a fixed relationship exists between the number of motor steps and the number of units of required motion. The axes consist of a major axis 41, and a minor axis 42, the major axis requiring more units of motion than the minor axis. The distance between the start $h$ and the end $i$ are defined by data along each axis, the end is 4 units from the start in the direction of the minor axis 42, and 10 units from the start in the direction of the major axis 41.

It can be seen that in order to closely approximate the linear path by a series of major-minor axes incremental moves, there need be only two possible move combinations, step the major axis one unit, or step both the major and minor axes one unit. Thus, in accordance with the present invention for every clock pulse, the major axis is always incremented one unit; to perform two axis linear interpolation, it is only necessary to logically determine each clock pulse if the minor axes should also be incremented one unit.

Figure 5:
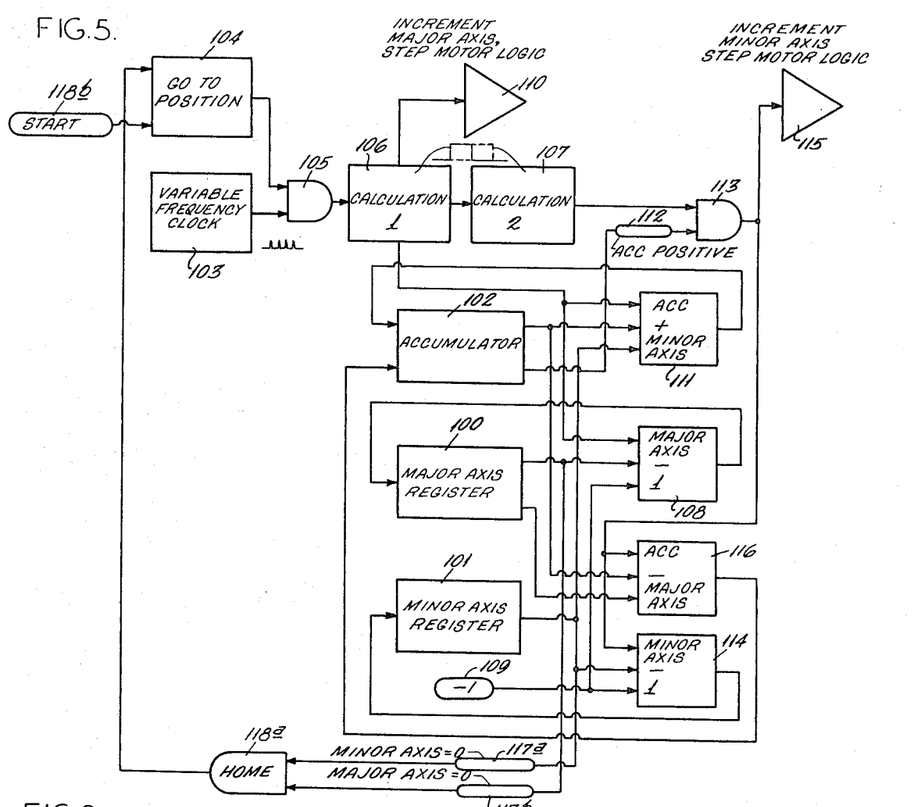
FIG. 5 is a schematic block diagram of the system for generating linear motion.

Referring to FIG. 5, the block diagram illustrates the logic that generates linear motion in a two dimensional system. It should be understood that the logic for a three dimensional system is merely a further extension of the same type of system. Prior to making each linear movement, the major axis register 100 is first set at the number of units of movement which will be required by major axis motion, the minor axis 101 is then set at the number of units of movement which will be required by minor axis motion, and an accumulator register 102 is set at zero. The variable frequency clock 103, heretofore described in connection with FIG. 1, generates clock pulses. These pulses are gated through gate 105 in response to an output from a "go to position" flip flop 104 turned on by appropriate start means 118b. Gate 105 controls flow of the clock pulses to the interpolation registers. The calculation 1 and 2 components 106 and 107 are successive one-shot multivibrators or the equivalent which generate successive pulses which represent successive time intervals in which successive steps in calculation may occur. The feedrate clock pulse actuates the first multivibrator 106 generating a pulse whose width gives time for a first arithmetic calculation in the system, during which and as the result of the output therefrom the major axis register 100 is always decremented by one through decremental register 108 and inputs from unit decremental supply source 109, one shot multivibrator 106 and major axis register 100. Simultaneously, a single pulse unit is output to the major axis step motor logic 110. Also the contents of the minor axis register 101 is added in adder register 111 to the contents of the accumulator 102. At the end of the pulse generated by multivibrator 106, its output generated an output pulse of similar length from multivibrator 107 giving a second calculation period. The output of the accumulator register 102 is tested at the time by means 112 sensing the positive number storage capacity of the register to determine whether its contents contain a positive number. If it does not, during the second calculation period generated by multivibrator 107, the input of AND gate 113 has but one signal imposed and no signal is passed to the minor axis step motor logic 115 so that no action is taken during the second calculation. However, if the accumulator 102 does contain a positive number during the second calculation interval, AND gate 113 passes a signal, the signal output from gate 113 causes the minor axis register 101 to be decremented by one through decremental register 114 and inputs from the minor axis register 101 and decremental supply source 109. At the same time the output gate 113 causes one unit output to the minor axis step motor logic 115. The output signal from gate 113 also causes the contents of the accumulator 102 to be decremented by the contents of major register 110 through decremental register 116. Sets of calculations continue until the contents of the minor axis register 101 equals zero and is so sensed by detector 117a and the contents of the major axis register 100 equals zero and is so sensed by detector 117b, at which time "home" AND gate 118a passes a signal to the "go to position" flip flop 104 which is turned off closing gate 105 blocking clock pulses 106 from going to the interpolation registers.

Figure 6:
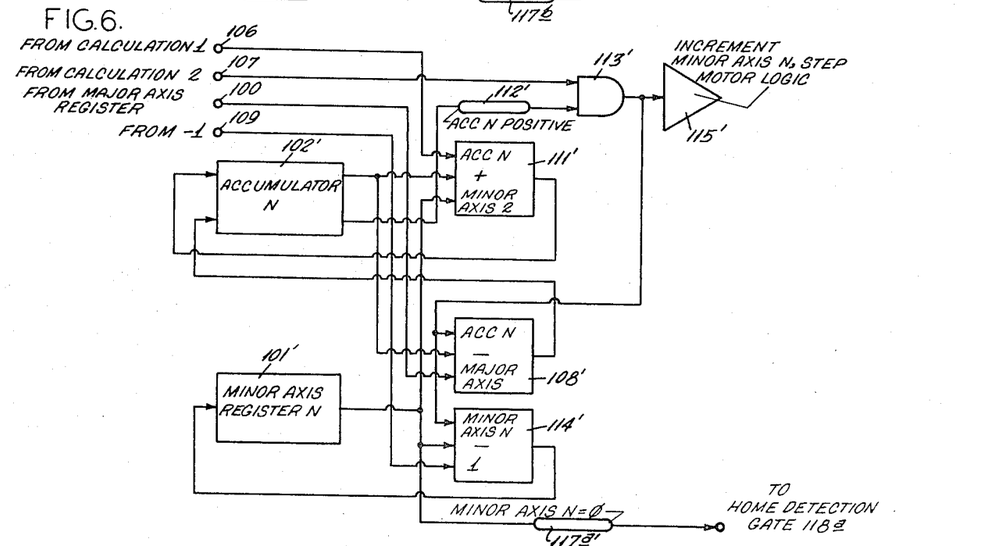
FIG. 6 is a schematic block diagram of the additional system required to generate linear motion over three control axes.

FIG. 6 illustrates additions to the logic system of FIG. 5 necessary to the use of a third axis N. Inputs from the system components of FIG. 5 are shown to the additional components required. Since the components added are in direct correspondence to the components of the minor axis components of FIG. 5 they have been given corresponding numbers with the addition of primes thereto. The system furthermore functions with respect to the major axis components just as the minor axes components described in connection with FIG. 5 does. In short, the minor axis N is dependent on the major axis in exactly the same ways as the other minor axis is. It will be appreciated that other axes may be added in a given system, and additional minor axes created thereby will require reproduction of the system of FIG. 6 for each such additional axis. The home gate 118a in such case will require zeros from all of the axis registers to turn off the "go to position" register 104.

As will be appreciated from the description hereafter the pulses output in step with clock pulses are interpolation pulses and do not drive the step motors. However it is useful to imagine the movement which would theoretically occur if the interpolation pulses drove the step motors.

FIG. 4 illustrates an example of how the logic of FIG. 5 works, where major axis movement X = 10 and minor axis movement Y = 4, there follows a numerical tabulation resulting from the linear motion logic. More specifically, the following table gives the contents of the major axis, minor axis, and the accumulator registers at the end of the calculation following the designated clock pulse, and each major step and minor step designated represent interpolation output pulse commands to the step motor logic:

| Clock pulse | Major Register | minor register | acc register | Major Int. step | Minor int. STEP |
|---|---|---|---|---|---|
| 0 | 10 | 4 | 0 | | |
| 1 | 9 | 4 | 4 | 1 | |
|  | 9 | 3 | −5 | | 1 |
| 2 | 8 | 3 | −2 | 1 | |
| 3 | 7 | 3 | 1 | 1 | |
|  | 7 | 2 | −6 | | 1 |
| 4 | 6 | 2 | −4 | 1 | |
| 5 | 5 | 2 | −2 | 1 | |
| 6 | 4 | 2 | 0 | 1 | |
| 7 | 3 | 2 | 2 | 1 | |
|  | 3 | 1 | −1 | | 1 |
| 8 | 2 | 1 | 0 | 1 | |
| 9 | 1 | 1 | 1 | 1 | |
|  | 1 | 0 | 0 | | 1 |
| 10 | 0 | 0 | 0 | | 1 |

As seen by reference to FIG. 4 and the above table, on the first clock pulse both the major and minor axis step motor logics receive interpolation pulses, and the theoretical output is indicated by the diagonal segment 43. The next clock pulse represents a step parallel to the major axis only along segment 44, following by another step along both axes during segment 45. Next three successive steps occur along the major axis to form segment 46. Then alternate segments 47 and 49 are produced by two axis movement with intermediate steps 48 and 50 only along the major axis. The last segment 50 terminates coincident with the end point 42 of the desired path after the 10th clock pulse.

Since interpolation pulses are accumulated to generate say one step pulse for 10 interpolation pulses, steps are not taken in such detail and the path traversed by the stepping operation along the major and minor axes does not conform to the path 40. However, it will be noted that in the theoretical path illustrated is the deviation from the desired path greater than one unit. By keeping interpolation pulse step units small, the minor deviations would be hardly perceptible. In practice the averaging effect of pulse accumulation reduces actual deviation even further.

It can be seen that since the number of clock pulses is always equal to the number of interpolation pulses required on the major axis, each additional axis of linear interpolation requires only an additional accumulator register and minor axis register, as already suggested in FIG. 6. For example, in that three dimensional system, if a segment has a major axis length of 10 and using two minor axis lengths of 4, separate sets of calculations between each of the minor axes and the major axes, each identical and as shown above, would be taking place. If the minor axis lengths are different from one another the movements will be different, but both related to the same clock pulses.

Figure 7:
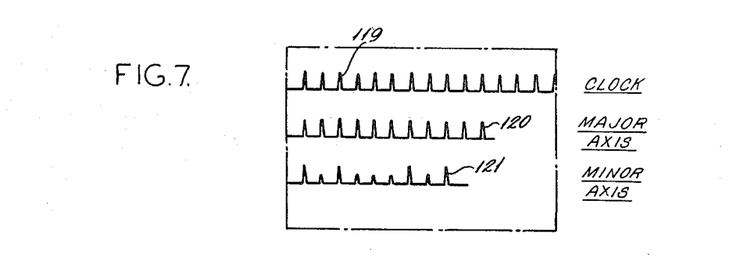
FIG. 7 is a representation of related output pulses chains from the linear interpolation logic.

FIG. 7 shows the relationship of the clock pulses 119 to the output pulses on the major 120 and minor axes 121 for the above described example. The major axis output pulses are evenly spaced in time and coincident with feedrate clock pulses, but the minor axis output pulses are not evenly spaced. Such uneven pulse spacing of minor axis pulses, if left uncorrected, would cause mis-stepping of the minor axis step motor at any time the minor axis step rate might be in the slewing range. To avoid this possibility in accordance with the present invention both major and minor axis pulses are collected and averaged to the end that step motor drive pulses may be evenly spaced by the scaling logic.

Figure 8:
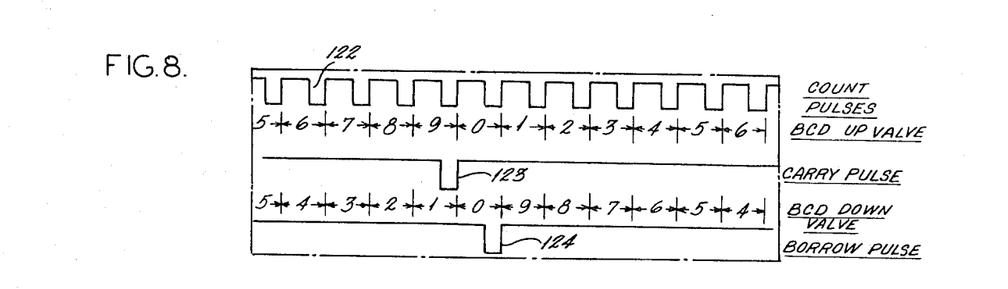
FIG. 8 is a representation of the output pulses from the axis scaling logic as a function of count pulses.

FIG. 8 shows a representation of the timing logic of a commercially available integrated circuit device, for example, Texas Instrument integrated circuit, type SN74192, which acts as a synchronous, programmable 4-bit binary coded decimal up/down counter. One device of this type for each axis, or one similar to it, receives interpolation pulses as an input and generates as an averaged output one step motor drive pulse for every ten interpolation pulses input. The internally wired logic in the device is such that its BCD (binary coded decimal) count value changes state on the positive going edge of a count pulse 122 which is generated for each interpolation pulse. Input count pulses into the circuit go from a positive level to a negative level back to the positive level; therefore the count value changes on the trailing (positive going) edge of the count pulse. An internal three input gate in the device outputs a "carry" output pulse 123, when the counter is counting up, and its BCD output value is set at 9, and an input count pulse occurs. Similarly an internal gate outputs a "borrow" output pulse 124, when the counter is counting down, and its BCD output value is at 0, and an input count pulse occurs.

As used in the present invention, the counting circuit starts its count at a value of 5. The programmed direction of rotation of the step motor determines whether the device counts up or down. For example, if clockwise rotation is desired the counter counts up, if counter-clockwise rotation is desired the counter counts down. For each interpolation pulse command from the interpolation logic 110, 115, the counter is either given a count up pulse or a count down pulse 122, depending upon the desired direction of travel. Either a carry output pulse 123 or a borrow output pulse 124 as generated by the counting circuit is used to drive the step motor one increment. Since the interpolation logic outputs 10 units for each motor step increment, the control logic calculates in units which are a magnitude of 10 times the resolution of the step motor. If the ratio of interpolation pulses to step motor increments were 1 to 1, the accuracy of the system could be no better than ± 1 step increment. However, using a ratio interpolation pulses to step motor increments of 10 to 1 increases the system accuracy to ± 6/10 of a step increment. This can be seen in the following chart which gives the error between the actual distance moved as a result of step motor output pulses and the calculated distance represented by the number of interpolation pulses for the above described 10 to 1 ratio.

| Interpolation Pulse | Count Circuit Value | Step Motor Pulse | Error (Cummulative) |
|---|---|---|---|
| 0 | 5 | | 0 |
| 1 | 6 | | 1/10 |
| 2 | 7 | | 2/10 |
| 3 | 8 | | 3/10 |
| 4 | 9 | | 4/10 |
| 5 | 0 | 1 | −5/10 |
| 6 | 1 | | −4/10 |
| 7 | 2 | | −3/10 |
| 8 | 3 | | −2/10 |
| 9 | 4 | | −1/10 |
| 10 | 5 | | 0 |
| Etc. | | | |

Since the accuracy of each linear interpolation calculation is ± 1 unit (which equals ± 1/10 step motor pulse), the total system accuracy is ± 5/10 step (see chart above) plus ± 1/10 step (the calculation accuracy) or ± 6/10 step.

Figure 9:
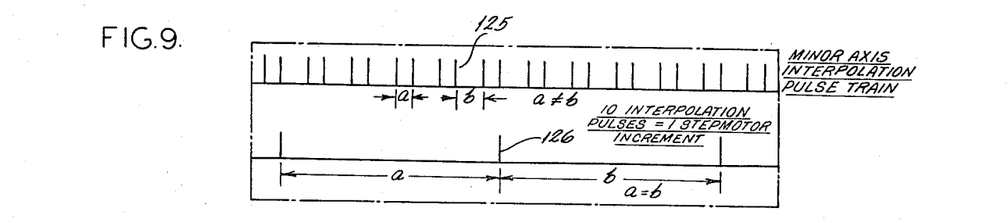
FIG. 9 is a representation of the output pulses from the axis scaling logic as a function of minor axis input pulses from the linear interpolation logic.

An equally important effect of this circuit, however, is that, by dividing the interpolation logic pulses 125 by a factor of 10, the time between pulses is averaged over 10 pulses. Major axis interpolation pulses, since they are coincident with feedrate clock pulses, are smoothly spaced in time. However, minor axis interpolation pulses 125 may not be, and usually are not, evenly spaced in time as shown in FIG. 9. Averaging the input minor axis interpolation pulses, causes the output pulses 126 driving the step motor to become evenly spaced in time. This averaging, in turn, allows a step motor to operate at slewing rates without slipping out of step.

An additional feature of the up down counter is that it stores the residual input-output error at the end of one programmed segment and then acts to correct the output of the subsequent programmed segment in such a way that the accumulated input-output error never exceeds ± 5/10 of an output step motor pulse.

Figure 10:
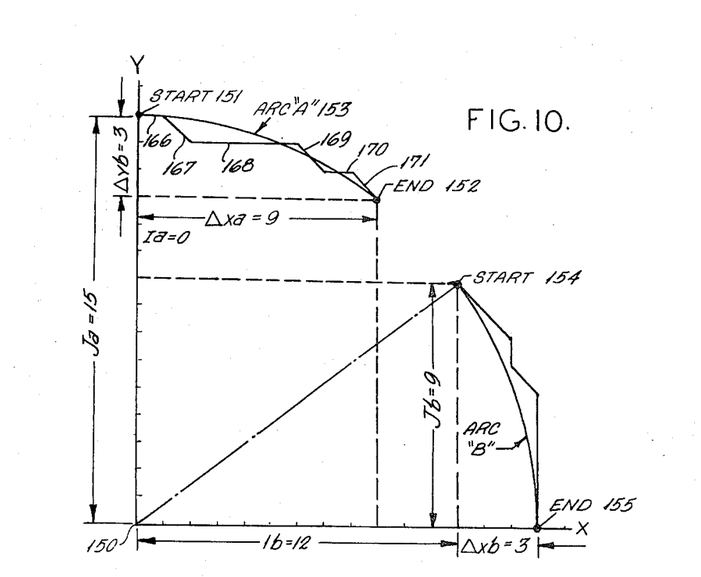
FIG. 10 is a diagrammatic illustration showing two desired arcuate paths of movement and the paths of movement achieved by the use of the present invention.

It should be noted in passing that FIGS. 4 and 10 represent great magnifications of the increments involved in connection with the present invention as a practical matter and, therefore, the length of segments taken in the example are for shorter than would be the case in essentially all practical applications.

FIG. 10 illustrates a theoretical pattern of movement in accordance with the present invention due to interpolation pulse along a path which approximates a true arc. Referring to FIG. 10, there are shown two circular arcs of the same radius taken from a selected origin assigned $x = 0$, $y = 0$: arc A with a start point 151 and an end point 152 and arc B with a start point 154 and an end point 155. It can be seen that in order to closely approximate arc A by a series of incremental moves, there need be only two possible move combinations; i.e., step the X axis one unit or step both the X and Y axis one unit. Similarly, to closely approximate arc B by a series of incremental moves, there need be only two possible move combination, i.e., step the Y axis interpolation system for generating arc A, the X axis can be considered the major axis since its movement occurs at each increment which may be at each clock pulse. Similarly in such a system for arc B, the Y axis can be considered the major axis. The distance from the center of the circle to any point currently occupied on the approximated path of an arc, such as arcs A and B, generated by the interpolation logic may be expressed in terms of rectangular co-ordinates. The X coordinate distance, measured along the X axis is denoted as I, with $Ia$ and $Ib$, respectively, indicating points on arcs A and B in FIG. 10 and the Y coordinate distance, measured along the Y axis, is denoted as J, with $Ja$ or $Jb$, respectively, indicating points on arcs A and B in FIG. 10. At the start points 151 of the arc A; $Ia = 0$, $Ja = 15$. At the start point 154 of arc B; $Ib = 12$, $Jb = 9$. If J is greater than I, as in arc A, the X axis is the major axis. If I is greater than J, as in arc B, the Y axis is the major axis. In the course of a given arc it is possible for the major axis to change.

Figure 11:
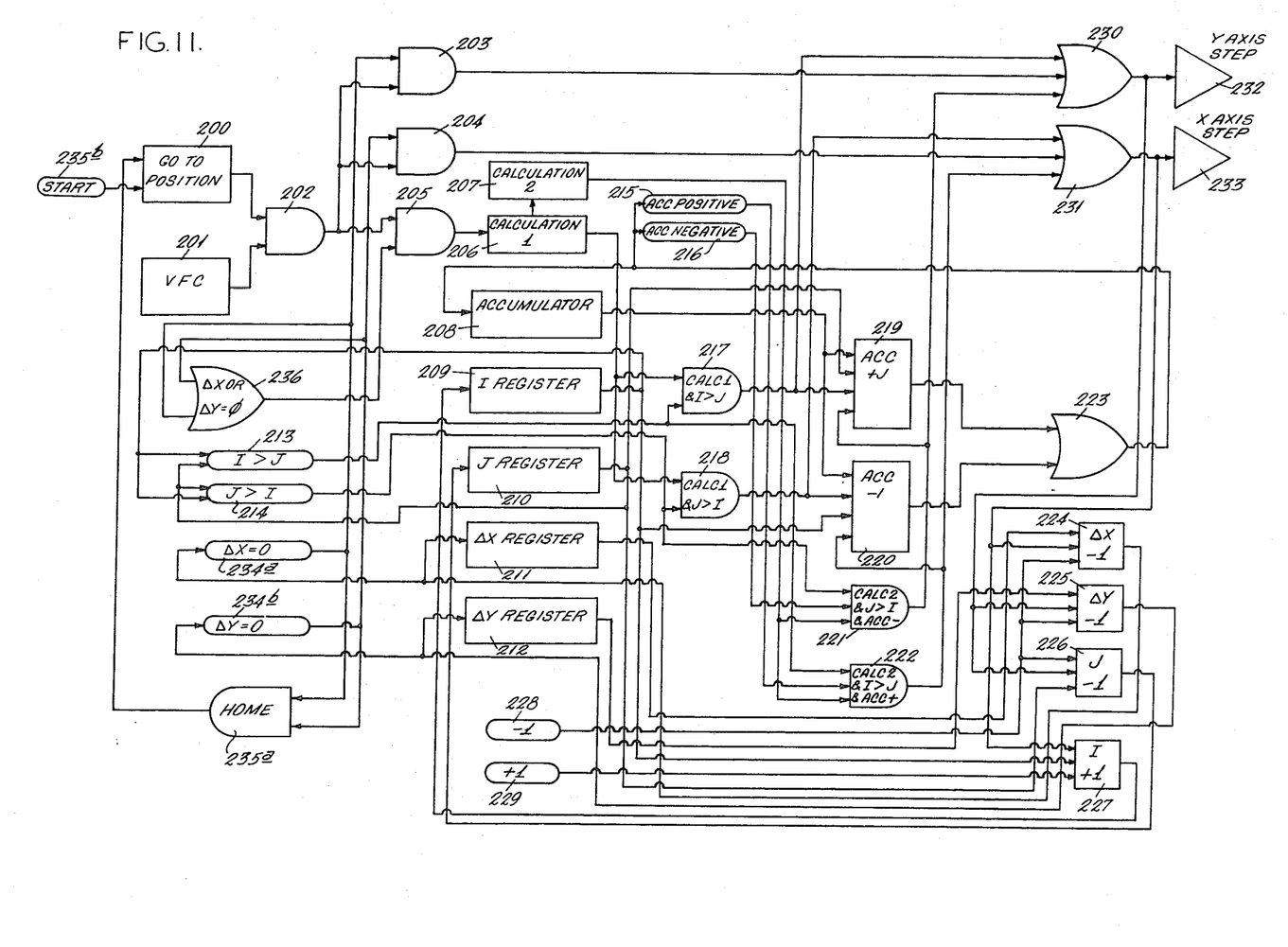
FIG. 11 is a schematic block diagram of the system for generating two dimensional arcuate motion.

Referring to FIG. 11, there is shown a block diagram of a logic system in accordance with the present invention that generates interpolation pulses collected and averaged to obtain step motor pulses for arcuate motion. As with linear interpolation, it is convenient to think of theoretical motion taking place generated by the interpolation pulses. Initially, the I register 209 is set at the value of the X coordinate distance from the circular origin 150 (in FIG. 10) to the start point 151 (considering arc A in FIG. 10), measured by the X axis. The J register 210 is set at the value of the Y coordinate distance from the same circular origin to the same start point (e.g., point 151) measured along the Y axis. The ΔX register 211 is set at the number of units of X axis motion required to reach the end point (e.g., 152 in arc A). The ΔY register 212 is set at the number of units of Y axis motion required to reach the same end point. The accumulator 208 is set at zero. The variable frequency clock 201, of the type heretofore described in connection with FIG. 1, generates clock pulses. These pulses are controlled by gate 202 with a "go to position" flip flop 200 turned on by appropriate start means 235b and then passed by gate 205 controlled by an output from OR gate 236 that closes the gate 205 if either ΔX or ΔY equals zero so that clock pulse goes through gate 203 directly into the Y axis step logic input 230. If Y = 0, the clock pulse goes through gate 204 directly into the X axis step logic input 231. If neither ΔX or ΔY equals zero, gate 205 enables clock pulses to enter the interpolation registers. Previous to the first calculation, the major axis is determined by comparison to determine if I is greater than J in comparitor 213, or J is greater than I in comparitor 214.

During the first calculation period set by multivibrator 206, if I is greater than J: (1) the accumulator 208 is augmented by the contents of the J register 210 through the combination of signals on gate 217 by way of adder register 219, (2) a Y axis step is commanded through Y axis step logic input 230, (3) the ΔY register 212 is decremented by one through ΔY decremental register 225, and (4) the J register 210 is decremented by one through the J decremental register 226.

If on the other hand during the first calculation, J is greater than I: (1) the accumulator 208 is decremented by the contents of the I register 209, through the combination of signals on gate 218 by way of adder register 220, and (2) X axis step is commanded through X axis step logic input 231, (3) the ΔX register 211 is decremented by one through ΔX decremental register 224, and (4) the I register 209 is augmented by one through the I decremental register 227.

The accumulator register 208 is tested by means 215 and 216 sensing the storage condition of the accumulator register at the conclusion of the calculation to determine whether its contents contain a positive or a negative number. If J is greater than I, in accordance with the output of comparitor 214, and the accumulator register is not negative as sensed by means 216, no action is taken during the second calculation period established by multivibrator 207. If I is greater than J, in accordance with the output of comparator 213, and the accumulator register is not positive as sensed by means 215, no action is taken during the second calculation 207. If J is greater than I and the accumulator is negative as detected by AND gate 221, during the second calculation during the period established by multivibrator 207: (1) the accumulator 208 is augmented through register 219 by the contents of the J register 210, (2) a Y axis step is commanded through Y axis step logic input 230, (3) the ΔY register 212 is decremented by one through ΔY decremental register 225, and (4) the J register 210 is decremented by one through J decremental register 226.

If I is greater than J and the accumulator is positive as detected by AND gate 221, during the second calculation: (1) the accumulator 208 is decremented through register 220 by the contents of the I register 209, (2) an X axis step is commanded through X axis step logic input 231, (3) ΔX register 211 is decremented by one through ΔX decremental register 224, and, (4) the I register 209 is augmented by one through J decremental register 227. Sets of calculations continue until the contents of both the ΔX and the ΔY registers equal zero as detected by sensors 234a and 234b indicating ΔX = 0 and ΔY = 0, respectively. When both ΔX and ΔY are zero the AND home gate 235a turns off the "go to position" command flip flop 220 blocking clock pulses from entering the logic through gate 202.

Summarizing the above logic, a test is made to determine the major axis by comparing the contents of the I and J register. During the first calculation, the major axis is always stepped. During the second calculation, the minor axis is stepped only if the signed value of the accumulator is appropriate.

In the example given above applied to Arc A in FIG. 10, where $I = 0$, $J = 15$, $\Delta X = 0$, $\Delta Y = 3$, the following is a numerical tabulation resulting from the arcuate motion logic:

| clock pulse | I register | J register | acc register | ΔX register | ΔY register |
|---|---|---|---|---|---|
| 0 | 0 | 15 | 0 | 9 | 3 |
| 1 | 1 | 15 | 0 | 8 | 3 |
| 2 | 2 | 15 | −1 | 7 | 3 |
|   | 2 | 14 | 14 | 7 | 2 |
| 3 | 3 | 14 | 12 | 6 | 2 |
| 4 | 4 | 14 | 9 | 5 | 2 |
| 5 | 5 | 14 | 5 | 4 | 2 |
| 6 | 6 | 14 | 0 | 3 | 2 |
| 7 | 7 | 14 | −6 | 2 | 2 |
|   | 7 | 13 | 8 | 2 | 1 |
| 8 | 8 | 13 | 1 | 1 | 1 |
| 9 | 9 | 13 | −7 | 0 | 1 |
|   | 9 | 12 | 6 | 0 | 1 |

Again in terms of theoretical movement on the first clock pulse, only the major axis, X, steps; the generated output is indicated by segment 166. The next clock pulse generates motion on both the major and minor axes 167. Next the major axis moves alone along segment 168 for four steps before the next combination major-minor axes move along segment 169. This is followed by a single major axis step along segment 170 and a combination segment 171 to bring the parts coincident with the end point 152 of the desired arc.

The same type of analysis is applicable to arc B except that it will be apparent that the major axis is the Y axis and the X axis is the minor axis. It is, furthermore, apparent that arc B could be an extension of arc A, in which event at some point the major axis would change from the X axis to the Y axis, which would automatically occur and be sensed by comparators 213 and 214 in the logic system of FIG. 11.

The path traversed by the stepped operation along the major and minor axes does not exactly conform to the desired path of arc A. However, it can be shown that at no place in the traversed path is the deviation greater than 2 units. As with linear interpolation, the output of the interpolator then enters a scaling device such that 10 units of interpolation output equals 1 step motor increment and thus the system accuracy for an arcuate portion is within ± 7/10 of a step increment. The scaling device, heretofore described, also smooths out the pulses so that there is no sudden change of frequency between steps.

It is accordingly understood that there has been disclosed a method and apparatus for moving a step motor along a linear path by incremental movements on multi-axes or along an arcuate path by incremental movements on a X and Y axis at feed rates that are infinitely variable from a few steps per second to several thousand steps per second, the step commands being so output as to take in consideration the dynamic properties of the step motor.

We claim:

1. In a system capable of moving one part relative to another by relative movement of at least three series connected relatively movable members along at least two predetermined axes defined by cooperating structure of adjacent members and having at least two step motors each acting between and moving said adjacent members along the predetermined axes in discrete increments and acting together to drive said parts along a series of successive segments approximating a predetermined path, the improvement comprising
  clock pulse generator means for generating a train of clock pulses;
  logic means to select as a major axis that one of the axes having the greater number of steps to be taken over at least the segment next to be followed;
  interpolation pulse generator means for generating a major axis interpolation pulse for each clock pulse and minor axis interpolation pulses as required by the logic of the system to follow the segment, said interpolation logic employing means whereby minor axis interpolation pulses are derived only after each major axis pulse upon immediate evaluation of whether an interpolation pulse is required along each minor axis and before the next clock pulse; and
  means for deriving step motor pulses to drive their respective step motors from said interpolation pulses for the respective axes.

2. The system of claim 1 in which at least two registers are provided to store remaining major and minor interpolation steps to be taken and an accumulator register is provided into which predetermined outputs from the other registers are transferred to control minor axis interpolation pulses.

3. The system of claim 1 in which means are provided to generate successive calculation periods defined by successive control pulses during the first of which major axis interpolation pulses are always generated and during second of which minor axis interpolation pulses may be generated as required by system logic.

4. The system of claim 3 in which at least two registers are provided to store remaining major and minor interpolation steps to be taken with means to decrement the register containing major axis steps and produce a major axis interpolation pulse during the first calculation period and in which an accumulator register is provided to receive calculations from the system logic during the first calculation period so that during the second calculation period when certain predetermined conditions are met, a minor axis interpolation pulse may be generated by means provided for that purpose and to decrement the register containing minor axis steps.

5. The system of claim 4 in which a linear segment is to be followed and in which the at least two registers are major and minor axis registers storing respectively the interpolation steps to be taken along the major and minor axes, respectively.

6. The system of claim 4 in which a circular arc segment is to be followed and in which there are at least four registers storing respectively the remaining interpolation steps to be taken along first and second axes and the coordinate position along said first and second axes of the current point in the segment being followed.

7. The method of simulating the following of a straight line segment by interpolation increments along predetermined major and minor axes where remaining steps to be taken along said axes are stored in major and minor axis registers and certain output logic originating from said registers is stored in an accumulator register comprising, setting the major axis register at the number of interpolation steps of which will be required by major axis motion,
  setting the minor axis register at the number of units of interpolation steps which will be required by minor axis motion,
  setting an accumulator register at zero,
  using each pulse from a variable frequency clock to generate successive timing pulses which represent first and second successive time intervals in which successive steps in calculation may occur,
  making a first arithmetic calculation in the period of the first timing pulse during which the major axis register is always decremented and a single interpolation pulse is output to the major axis step motor logic and the contents of the minor axis register is added in the accumulator register to the contents of accumulator,
  during the second calculation period testing the output of the accumulator register to sense positive number storage capacity of the register to determine whether its contents contain a positive number and
  if it does not, during the second calculation passing no signal to the minor axis step motor logic, but
  if the accumulator 102 does contain a positive number, passing a signal to cause the minor axis register to be decremented and causing one unit output to the minor axis step motor logic 115.

8. The method of simulating the following of a circular arc segment by interpolation increments along predetermined major and minor axes X and Y where remaining steps to be taken along said axes are stored in $\Delta X$ and $\Delta Y$ registers, the rectangular coordinate position at any given time with respect to a predetermined origin representing the center of the arc are stored in I and J registers corresponding to the X and Y coordinating from said registers is stored in an accumulator register by directly interpolation pulses into X and Y step motor logic, respectively, comprising
  setting the I register at the value of the X coordinate distance from the circular origin to the start point measured along the X axis,
  setting the J register at the value of the Y coordinate distance from the same circular origin to the same start point measured along the Y axis,
  setting the $\Delta X$ register at the number of units of X axis motion required to reach the end point of the arc segment,
  setting $\Delta Y$ register 212 at the number of units of Y axis motion required to reach said end point,
  setting the accumulator at zero,
  generating a train of variable frequency clock pulses,
  determining if either $\Delta X$ or $\Delta Y$ equals zero and, if so directing clock pulse directly into the other axis step logic input.
  If neither $\Delta X$ or $\Delta Y$ equals zero enabling clock pulses to enter the interpolation registers,
  previous to the first calculation, determining the major axis by comparison if I is greater than J or J is greater than I,
  establishing a first calculation period during which,
    if I is greater than J: (1) the accumulator is augmented by the contents of the J register (2) a Y axis step is commanded through Y axis step logic input, (3) the $\Delta Y$ register is decremented by one and (4) the J register is decremented by one, but if J is greater than I: (1) the accumulator is decremented by the contents of the I register and (2) X axis step is commanded through X axis step logic input (3) the ΔX register is decremented by one and (4) the I register 209 is augmented by one, Sensing the storage condition of the accumulator register at the conclusion of the calculation to determine whether its contents contain a positive or a negative number, and during a second calculation period if J is greater than I, and the accumulator register is not negative taking no action if I is greater than J, and the accumulator register is not positive, taking no action if J is greater than I and the accumulator is negative: (1) the accumulator 208 is augmented by the contents of the J register (2) a Y axis step is commanded through Y axis step logic (3) the ΔY register is decremented by one, and (4) the J register 210 is decremented by one.

If I is greater than J and the accumulator is positive, (1) the accumulator is decremented by the contents of the I register, (2) an X axis step is commanded through X axis step logic (3) ΔX register 211 is decremented by one, and, (4) the I register 209 is augmented by one, and continuing calculations until the contents of both the ΔX and the ΔY registers equal zero.

9. In a system capable of moving one part relative to another by relative movement of at least three series connected relatively movable members along at least two predetermined axes defined by cooperating structure of adjacent members and having at least two step motors each acting between and moving said adjacent members along the predetermined axes in discrete increments and acting together to drive said parts along a series of successive segments approximating a predetermined path, the improvement comprising logic means to select as a major axis that one of the axes having the greater number of steps to be taken over at least the segment next to be followed, means genrating an interpolation pulse train of evenly spaced pulses representing the major axis length of said segment logic means for each minor axis to generate a train of interpolation pulses the number of which minor axis interpolation pulses is representative of the length of that minor axis segment which, pulse train is composed at most of no more pulses than the major axis pulse train and the pulses in which train may be unevenly spaced;

separate means for each of said axes receiving interpolation pulses from said logic means and producing a step motor pulse for a predetermined number of interpolation pulses, whereby the variations in spacing of the minor axis interpolation pulse output is averaged so that pulses representing a fixed speed occur at regular intervals and so that the potential error in resolution is decreased.

10. The system of claim 9 in which the separate means for each of the axes is counter means into which interpolation pulses are fed and at a predetermined count of interpolation pulses an output step motor pulse is generated.

11. The system of claim 10 in which the predetermined count of interpolation pulses is some power of 10 for each output step motor pulse.

12. The system of claim 11 in which the count of the counter means starts at 5 times some power of ten and counts up or down depending on the direction of rotation required of the step motor generating respectively a carry pulse for count up or a borrow pulse for count down.

13. The system of claim 10 in which the counter means for each of the axes are not reset at the end of each programmed segment but the interpolation counts in each counter means is used as a correction for the next programmed segment.

14. The system of claim 12 in which the counter means for each of the axes may be at any count at the end of a programmed segment and is not altered so that it provides a correction of subsequent segments.

* * * * *